United States Patent
Hudson et al.

(10) Patent No.: US 9,977,955 B2
(45) Date of Patent: May 22, 2018

(54) METHOD AND SYSTEM FOR IDENTIFYING BOOKS ON A BOOKSHELF (71) Applicant: Rakuten Kobo, Inc., Toronto (CA)

(72) Inventors: Peter Michael Bruce Hudson, Vancouver (CA); Marius Constantin Muja, North Vancouver (CA); Andrew Cameron McNair, Vancouver (CA); Sancho Juan Carlos Dean Rob Roy McCann, Vancouver (CA)

(73) Assignee: Rakuten Kobo, Inc., Toronto (CA)

( * ) Notice: Subject to any disclaimer, the term of this patent is extended or adjusted under 35 U.S.C. 154(b) by 301 days.

(21) Appl. No.: 14/745,066

(22) Filed: Jun. 19, 2015

(65) Prior Publication Data
US 2015/0371085 A1 Dec. 24, 2015

Related U.S. Application Data (60) Provisional application No. 62/014,547, filed on Jun. 19, 2014.

(51) Int. Cl.
*G06K 9/72* (2006.01)
*G06K 9/00* (2006.01)
G06K 9/32 (2006.01)
G06K 9/46 (2006.01)

(52) U.S. Cl.
CPC ..... *G06K 9/00456* (2013.01); *G06K 9/00671* (2013.01); *G06K 9/3258* (2013.01); *G06K 9/4676* (2013.01)

(58) Field of Classification Search
USPC .......... 1/1; 348/207.99; 382/190; 455/456.1; 704/2; 705/80; 706/16, 25; 707/711
See application file for complete search history.

(56) References Cited

U.S. PATENT DOCUMENTS

| | | | |
|---|---|---|---|
| 6,940,545 B1 * | 9/2005 | Ray | G06K 9/00228 348/207.99 |
| 8,473,481 B2 * | 6/2013 | Williams | G06F 17/30011 707/711 |
| 8,521,507 B2 * | 8/2013 | Shi | G06F 17/30705 704/2 |
| 9,195,819 B2 * | 11/2015 | Hudson | G06F 3/0483 |
| 9,477,654 B2 * | 10/2016 | He | G06F 17/2785 |
| 2008/0082497 A1 * | 4/2008 | Leblang | G06F 17/30265 |
| 2009/0083677 A1 * | 3/2009 | Darwish | G06F 17/2229 715/854 |

(Continued)

OTHER PUBLICATIONS

Tsai, S., et al., Combining image and text features: a hybrid approach to mobile book spine recognition, In Proceedings of the 19th ACM International Conference on Multimedia, 2011.*

*Primary Examiner* — Xuemei Chen
(74) *Attorney, Agent, or Firm* — Oblon, McClelland, Maier & Neustadt, L.L.P.

(57) ABSTRACT

A method and system for identifying books located on a bookshelf. Photographs of the bookshelf are captured and processed to identify individual books. Processing involves segmenting the photograph into individual book spines and extracting and analyzing features of the book spines. Analysis may include database matching and/or optical character recognition. Book spines for which a match is not found are human labeled, and the label information is added to the database. User feedback is also used to update the database.

28 Claims, 3 Drawing Sheets

(56) References Cited

U.S. PATENT DOCUMENTS

| | | | |
|---|---|---|---|
| 2009/0106037 A1* | 4/2009 | Harindranath | G06Q 30/06 705/342 |
| 2012/0202515 A1* | 8/2012 | Hsu | G06Q 10/087 455/456.1 |
| 2014/0092241 A1* | 4/2014 | Brinkman | G06K 9/00671 348/135 |
| 2014/0310218 A1* | 10/2014 | Min | G06N 3/08 706/16 |
| 2015/0100530 A1* | 4/2015 | Mnih | G06N 3/0454 706/25 |
| 2015/0127594 A1* | 5/2015 | Parada San Martin | G06N 3/0454 706/16 |
| 2015/0170085 A1* | 6/2015 | Amtrup | G06Q 10/06316 705/7.26 |
| 2015/0213325 A1* | 7/2015 | Krishnamoorthi | G06K 9/6211 382/190 |
| 2015/0248735 A1* | 9/2015 | Stapp | G06Q 50/01 705/80 |
| 2016/0092471 A1* | 3/2016 | Wu | G06F 17/30247 705/310 |
| 2017/0047094 A1* | 2/2017 | Leppanen; Jussi | G11B 27/031 |

\* cited by examiner

METHOD AND SYSTEM FOR IDENTIFYING BOOKS ON A BOOKSHELF

CROSS-REFERENCE TO RELATED APPLICATION

This application claims the benefit under 35 U.S.C. § 119(e) of U.S. Application No. 62/014,547, filed Jun. 19, 2014, which is incorporated by reference in its entirety.

FIELD

The present invention pertains to the fields of artificial intelligence, data processing and image analysis and in particular to a method and system for identifying books on a bookshelf, offering associated electronic assets to a user, and/or training of a book recognition system.

BACKGROUND

People who own a physical asset often want to have the option of obtaining a matching digital asset. For example, owners of print books desire electronic versions of those physical books, and do not want to pay the full price for the eBook. One approach to this problem is described in International Patent Application Publication No. 2014/015437. That method and system provide a way for a book owner to validate their ownership of a physical media carrier (a book) and to obtain the associated digital asset, such as an eBook.

Previous solutions and industry standard approaches to book recognition are limited in their capabilities. Chen, David, Sam Tsai, Bernd Girod, et al. (2010), "Building book inventories using smartphones," in: Proceedings of the international conference on Multimedia, pp. 651-654 (hereinafter Chen et al.), and Tsai, Sam et al. (2011), "Combining image and text features: a hybrid approach to mobile book spine recognition," in: Proceedings of the 19th ACM international conference on Multimedia, pp. 1029-1032 (hereinafter Tsai et al.) present an approach that assumes the existence of a dataset describing the visual appearance of a relatively small number of book spines. This is problematic for a practical system in which it may be required to identify books selected out of millions of possibilities, rather than thousands as in the method of (Chen et al.). They demonstrated their method on a preconstructed database of 2300 book spines containing 5398 words. (Chen et al.) also make use of a limited set of features that can be inadequate for accurate identification on a large practical scale.

The system of (Tsai et al.) further uses an optical character recognition (OCR) engine to read the text that is on a spine and then matches that text against a database of book metadata. That book metadata commonly includes the title, subtitle, and author names. However, (Tsai et al.) is also limited for example in its ability to adapt to practical situations.

Hsu, Cheng-Hsin et al. (2011), "Smartphone-based asset management system," US Patent Application Publication No. 2012/0202515, (hereinafter the '515 application), discloses a method and systems relating to the research of (Chen et al.). Specifically, a method of tracking an inventory of objects via a mobile communications device is disclosed. The method comprises acquiring an image, collecting the location of the mobile device, and transferring the location and image to a remote server so that the spines can be identified, located, and their identity and location stored on a database. However, the '515 application is limited for example in that it requires a populated database of spine appearances for operation.

Williams, Oliver M. C. and Michael A. Isard (2009), "Object recognition and library," U.S. Pat. No. 8,473,481, (hereinafter Williams and Isard 2009) also claims a method for creating an object library comprising receiving an image, locating the portion of the image corresponding to an object surface and its boundary, identifying that located surface from a plurality of images of surfaces, and adding a record of that object into an object library. However, this approach is also limited for example in that it requires a populated database of spine appearances for operation.

Therefore there is a need for a method and system for identifying books on a bookshelf that obviates or mitigates one or more limitations of the prior art.

This background information is provided to reveal information believed by the applicant to be of possible relevance to the present invention. No admission is necessarily intended, nor should it be construed, that any of the preceding information constitutes prior art against the present invention.

SUMMARY

An object of embodiments of the present invention is to provide a method and system for identifying books on a bookshelf.

In accordance with embodiments of the present invention, there is provided a method for identifying books located on a bookshelf, the method having the steps of capturing one or more photographic images of the bookshelf, segmenting the photographic images into regions, each of the regions corresponding to a respective book spine, and analyzing at least one of the regions to identify a book corresponding thereto, wherein analyzing the at least one of the regions having the steps of extracting one or more visual features descriptive of the at least one of the regions, the one or more visual features including a feature indicative of machine-recognized text contained within the at least one of the regions, performing a matching operation based on the one or more visual features, the matching operation performed against stored data associating plural book identities with corresponding visual features, when the matching operation returns one of the book identities sufficiently closely matched with the one or more visual features, identifying the at least one of the regions as representing said one of the book identities, when the matching operation fails to return one of the book identities sufficiently closely matched with the one or more visual features, initiating a further analysis of the at least one of the regions to identify the book corresponding thereto, and when the further analysis returns a further book identity sufficiently closely matched with the one or more visual features, identifying the at least one of the regions as representing the further book identity.

In accordance with other embodiments of the present invention, there is provided a system for identifying books located on a bookshelf, the system having a mobile device configured to capture one or more photographic images of the bookshelf, a computer server configured to receive the captured one or more photographic images and to segment the photographic images into regions, each of the regions corresponding to a respective book spine, and analyze at least one of the regions to identify a book corresponding thereto, wherein the computer server is further configured, in furtherance of analyzing the at least one of the regions, to extract one or more visual features descriptive of the at least one of the regions, the one or more visual features including a feature indicative of machine-recognized text contained within the at least one of the regions, perform a matching operation based on the one or more visual features, the matching operation performed against stored data associating plural book identities with corresponding visual features, when the matching operation returns one of the book identities sufficiently closely matched with the one or more visual features, identify the at least one of the regions as representing said one of the book identities, when the matching operation fails to return one of the book identities sufficiently closely matched with the one or more visual features, initiate a further analysis of the at least one of the regions to identify the book corresponding thereto, and when the further analysis returns a further book identity sufficiently closely matched with the one or more visual features, identify the at least one of the regions as representing the further book identity.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

As used herein, the term "about" should be read as including variation from the nominal value, for example, a +/−10% variation from the nominal value. It is to be understood that such a variation is always included in a given value provided herein, whether or not it is specifically referred to.

It is contemplated that embodiments of the present invention are directed toward enabling accurate identification of the books on a user's bookshelf with limited user effort. This identification may be used for the purpose of determining which, if any, of a user's books are eligible for an offer of an associated digital asset, but without requiring a preconstructed reference dataset of book spine appearances.

To streamline the process of identifying for users which of their print books are available as a discounted eBook, embodiments of the present invention aim to identify the books on a user's bookshelves via user-captured photos. First, this allows for the provision of book-specific offers (discounted or free eBook versions, for example). Second, the set of books owned by a user may be used to guide our recommendations or to guide the user's exploration for their next book to read or buy. Both of these features benefit from a user being able to add a large number of books that they own to a user-specific catalogue with minimal effort and with high accuracy. The requirement for limited user effort, and the ubiquity of cameras on mobile phones leads to accomplishing of book identification via user-captured photos.

It is contemplated that embodiments of the present invention can simultaneously address the problems of book spine recognition from user-captured photos using OCR engine-specific text features and creation of a database of book spine appearances. As such, embodiments of the present invention can address one or both of the following issues. The first issue relates to how to build a dataset of book spine appearances. The second issue relates to how to use those spine appearances to recognize observations of book spines in the future.

It is contemplated that embodiments of the present invention can include a process for gathering accurately labeled training data of book spines and then using that labeled training data to improve the performance of an automated book spine identification system.

It is contemplated that embodiments of the present invention can relate to a system and a method for determining the identity of books in user-captured photographs of their bookshelves using OCR-engine-specific text features while simultaneously constructing the reference dataset used in that identification.

It is contemplated that embodiments of the present invention can relate to a system comprising a collection of computers, datastores and databases, and one or more user devices such as mobile devices, smartphones, network-enabled cameras, tablets, laptops, or the like. The computers, datastores and databases, and user devices are communicatively coupled for example by Internet network infrastructure, data networks offered by wired or wireless network service providers, or the like, or a combination thereof. The computers, datastores and databases may correspond to dedicated servers, cloud-based server technology, or the like. It is contemplated that the user devices operate to capture photographs and to interface with the user for providing instructions thereto, for receiving other data therefrom, and for presenting offers such as eBook offers. The computers operate to receive and process the photographs. The datastores and databases operate to store information generated by the computers and to provide information to the computers upon request. The computers and user devices may be general-purpose devices that are configured to act as components of the system as described herein through the use of appropriately installed computer program instructions.

It is contemplated that embodiments of the present invention can relate to a method for identifying books that can be implemented by one or a combination of computers and user devices, including servers, wireless devices, or the like. The computers and user devices may be general-purpose devices that are configured to act as components of the system as described herein through the use of appropriately installed computer program instructions. The computers and user devices may include microprocessors operatively coupled to memory, the memory including program instructions for executing the method. The user devices may include an image capture device such as a digital camera and a user interface, such as a touchscreen, among other embodiments that will be readily appreciated by the skilled person.

Figure 1:
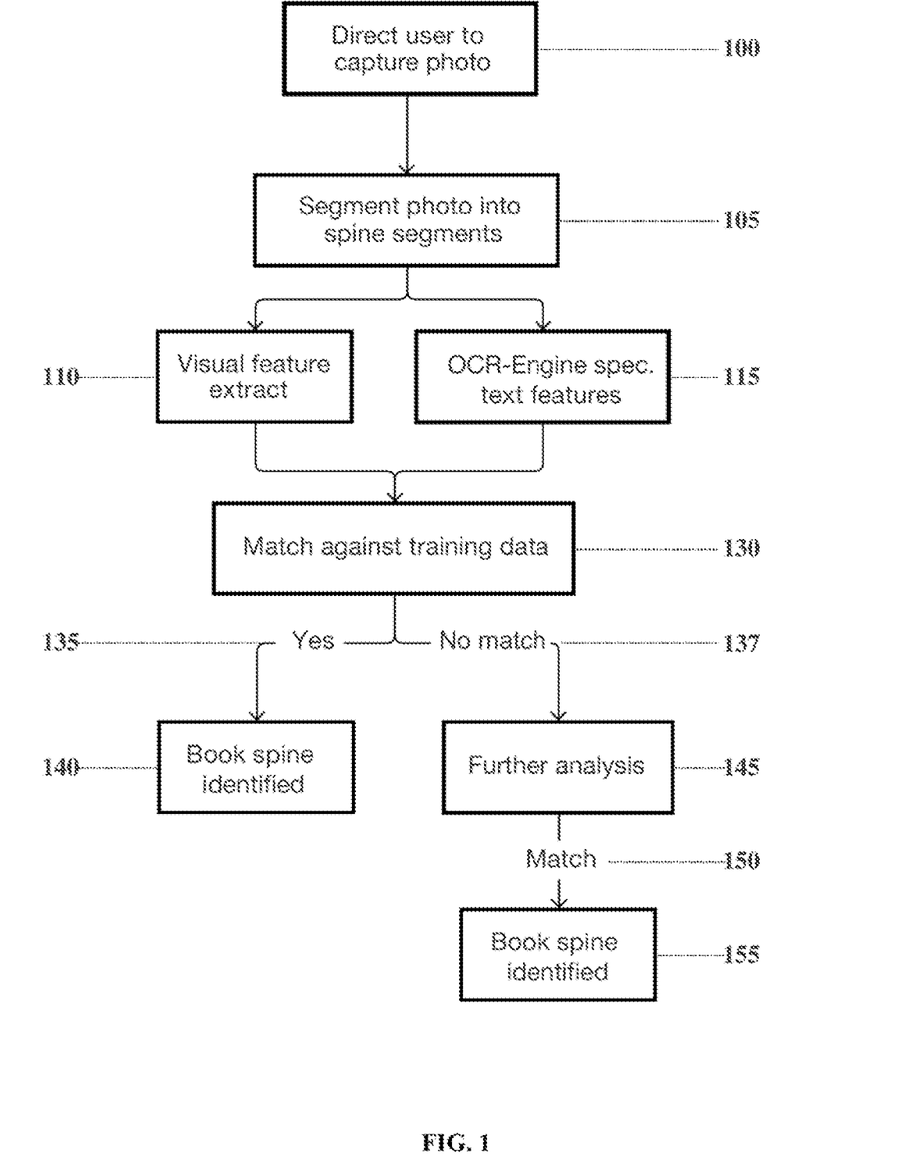
FIG. 1 illustrates a method for identifying books located on a bookshelf, in accordance with an embodiment of the present invention.

Having reference to FIG. 1, an aspect of the present invention relates to a method for identifying books on a bookshelf. The method includes guiding a user to capture 100 an adequately well-aligned photo of their bookshelf, which may be sent to a segmentation server. The method further includes segmentation 105 of that photo image into book spine segments. The method further includes visual feature extraction 110 from each spine segment. The visual features, which may also be referred to as optical features, may include OCR-engine-specific text features 115, that is, a feature indicative of machine-recognized text contained within a spine segment region. The method further includes analyzing spine segments to identify books corresponding thereto. The analysis may include attempted matching 130 of extracted features against a training set of book data. The analysis may include analyzing one or more visual features descriptive of the at least one of the regions, the one or more visual features including a feature indicative of the machine-recognized text contained within the at least one of the regions. The matching operation 130 may be performed against stored data associating plural book identities with corresponding visual features. The analysis may further include, when the matching operation returns 135 one of the book identities sufficiently closely matched with the one or more visual features, identifying 140 the at least one of the regions as representing said one of the book identities. The analysis may further include, when the matching operation fails to return 137 one of the book identities sufficiently closely matched with the one or more visual features, initiating a further analysis 145 of the at least one of the regions to identify the book corresponding thereto. The analysis may further include, when the further analysis returns 150 a further book identity sufficiently closely matched with the one or more visual features, identifying 155 the at least one of the regions as representing the further book identity.

In various embodiments, the method may further include reverting to human labeling if matching fails. The method may further include prompting the user for feedback regarding the accuracy of the eventual identification. The feedback may include an indication of whether or not the identification is accurate, and, if not, the feedback may include user-provided identification information.

In some embodiments, ambiguities arising during feature-based identification of a spine segment associated with a first user are resolved by reference to other users' identified book collections that are similar in content to the first user's current collection.

In some embodiments, ambiguities arising during feature-based identification of a spine segment are resolved by reference to the empirically observed distribution of book titles on all users' bookshelves.

In various embodiments, the above method further includes folding the newly observed features into the training set. In various embodiments, the above method further includes presenting the user any offers associated with the identified books.

In some embodiments, the present invention includes a mobile device configured to guide a user to capture a well-aligned photo of their bookshelf, to present them with the results of the book identification, to allow them to mark each identification as correct or incorrect, to allow them to provide the correct identification, to claim offers associated with the identified books, and to browse the results of other users' bookshelf photos.

In some embodiments, the present invention includes a communication channel between the mobile device and a remote server. The mobile device communicates the photo to the remote server and the remote server communicates the identification results to the mobile device. User feedback regarding correct or incorrect identifications is communicated to the remote server. The remote server determines what books are eligible for offers and communicates those offers to the mobile device.

In some embodiments, the remote server comprises a collection of several computers, each performing a specialized microservice. The remote server also contains several datastores. A first datastore is configured to store intermediate processing results and to track associations between users, images, segments, recognition results, and offers. A second datastore is configured to store the features extracted from book spine segments, and a third to store a collection of book metadata (authors, titles, publishers, ISBNs). The microservices include: image segmentation into book spine subregions, feature extraction (including optical character recognition), serving a user interface to human labelers, communication with the mobile device, serving an API to query into the database of book metadata, and performing matching of a query segment's features against the training set. Particular embodiments may host several of these microservices together on one computer. Decentralized computing solutions, virtualized computing solutions, or the like, may be employed to provide the microservices.

Figure 2:
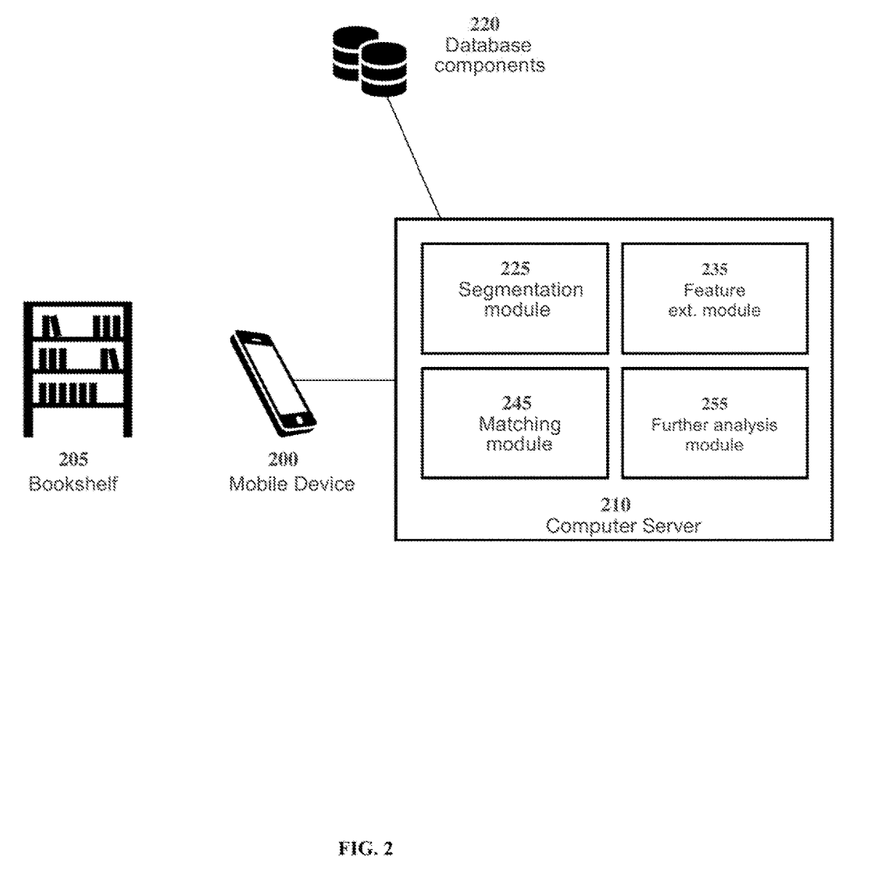
FIG. 2 illustrates a system for identifying books located on a bookshelf, in accordance with an embodiment of the present invention.

Having reference to FIG. 2, an aspect of the present invention provides a system for identifying books located on a bookshelf. The system includes at least a mobile device 200 communicatively coupled to a computer server 210, and possibly one or more database components 220 also coupled to the computer server or collection of computers. The mobile device is configured to capture one or more photographic images of the bookshelf 205. The computer server is configured to receive the captured one or more photographic images. The computer server is further configured, for example due to the operation of various functional modules, which may also be described herein as microservices, to perform operations related to segmentation and analysis of the photographic images. These operations include segmenting the photographic images into regions, for example via operation of a segmentation module 225, each of the regions corresponding to a respective book spine and analyzing at least one of the regions to identify a book corresponding thereto. To support the analysis, the computer server is further configured to extract one or more visual features descriptive of the at least one of the regions, for example via operation of a feature extraction module 235, the one or more visual features including a feature indicative of machine-recognized text contained within the at least one of the regions. The computer server is further configured to perform a matching operation based on the one or more visual features, for example via operation of a matching module 245, the matching operation performed against stored data associating plural book identities with corresponding visual features. When the matching operation returns one of the book identities sufficiently closely matched with the one or more visual features, identify the at least one of the regions as representing said one of the book identities. When the matching operation fails to return one of the book identities sufficiently closely matched with the one or more visual features, initiate, via a further analysis module 255, a further analysis of the at least one of the regions to identify the book corresponding thereto. When the further analysis returns a further book identity sufficiently closely matched with the one or more visual features, identify the at least one of the regions as representing the further book identity.

Embodiments of the present invention are configured to record what words the OCR engine actually observes and/or where on a spine the OCR engine observes them, and to use that information as training data. In other words, the observed words can be used as analogues of visual features, rather than attempting to simply match the observed text against the book metadata. For example, if the phrase "New York Times Bestseller" appears consistently on the spines identified as a particular book, but not in the book metadata, previous systems would not take advantage of this, and may in fact be hampered by the extra text, as it would fail to match the correct book's metadata.

Some embodiments of the present invention are configured so as to avoid tracking the locations of objects. Instead, such embodiments associate the identified objects with the identity of the user, regardless of location.

It is further recognized herein that there are several problems with current methods of text matching, which may be addressed by embodiments of the present invention. First, text detection on spines is imperfect—text on the spine may systematically go undetected or be detected only partially, and these systematic errors are particular to the OCR engine being employed. Second, not all the text found on the book spine will be included in the book metadata. For example, the words "Edited by", "New York Times Bestseller", or an unreported subtitle. Third, not all the text in the book metadata appears on the spine. For example, the reported subtitle may appear only on the cover or inside page, the author's full name may not appear on the spine, and the publisher doesn't necessarily appear on the spine by name.

Particular Embodiments

A detailed description of particular embodiments of the present invention is described below. While this description may elucidate various features of the present invention, the invention is not intended to be limited to this embodiment.

A mobile device, such as a smartphone, is configured to be a part of the system by installation of an application or "app". This app may be available from a standard repository such as the Google Play™ store or the iPhone™ App Store™. That app configures the mobile device to provide the functionality necessary to guide the user to take an adequate bookshelf photo, to communicate the photo to the remote server, to provide the identification results to the user, to allow the user to provide feedback regarding the identification results, to allow the user to claim the offers associated with some of the identified books, and to browse the results of other users' bookshelf photos.

Browsing of other users' bookshelf photos may comprise accessing their bookshelf photos as stored on a remote server and/or accessing the identification information associated with books on that bookshelf In some embodiments, the bookshelf photos may be annotated with, or presented alongside, book identification information. For example, when a user displays the photo on a mobile device screen and selects a spine segment of the photo, the information of the book corresponding to the spine segment may be displayed on the screen. In some embodiments, browsing, by a first user, of other users' bookshelves, subject to applicable permission settings, may be enabled when there is at least a predetermined amount of overlap between the recognized book titles associated with the first user's bookshelf and the recognized book titles associated with the other users' bookshelves.

The recipient of communication at the remote server is a computer running a Play™ Application written in Scala™. This can be advantageous because Play™ is stateless, and supports asynchronous I/O. Thrift™ serialization may be used to form the messages that are passed between computers within our system. Further, RabbitMQ™ may be used as the communication layer.

The segmentation process is performed by one of several computers configured with a microservice that segments an image into subregions (spine segments). Each spine segment ostensibly closely matches the extent of an individual book spine in the image. This module may utilize an improved version (described in the following paragraphs) of the algorithm described in (Chen et al.) and also a variant (described below) of the algorithm described in Talker, Lior (2013), "Book spine segmentation for bookshelf reorganization," M.Sc. Thesis. (hereinafter Talker).

In some embodiments, the segmentation server first classifies the image into book pixels and background pixels. This is referred to as book/background segmentation. A pixel is classified as a book pixel if it comes from a region that the system estimates to be a book or an edge between books. A pixel is classified as a background pixel if the system estimates that it comes from a region of the image not containing a book (cabinet, shelf, wall, etc.). TextonBoost Shotton, Jamie et al. (2009), "TextonBoost for Image Understanding: Multi-Class Object Recognition and Segmentation by Jointly Modeling Texture, Layout, and Context," in: International Journal of Computer Vision, (hereinafter Shotton et al. 2009) may be used for this task. The pixels classified as book pixels comprise the book region.

If the above book/background segmentation is performed, then only pixels within the book region are used to inform a segmentation of that region into individual book spines. Otherwise, all pixels in the image are used to inform the segmentation of the image into individual book spines. The system functions in either case, but without the book/background segmentation, the system is less robust to background noise.

The dominant orientation of the book spines is determined using Canny edge detection as described in Canny, J (June 1986), "A Computational Approach to Edge Detection," in: IEEE Trans. Pattern Anal. Mach. Intell. 8.6, pp. 679-698. ISSN: 0162-8828. DOI: 10.1109/TPAMI.1986.4767851, (hereinafter Canny 1986) and a probabilistic Hough transform to find strong line segments within the book region (or the entire image, if the system did not perform book/background segmentation). Many of these line segments are caused by the edge of a book. The most frequently observed line orientation is considered to be the orientation of the books in the book region (or the entire image, if the system did not perform book/background segmentation). Edges inconsistent with this dominant orientation are suppressed. The text on the book spines tends to produce spurious book boundary predictions. To remove the effect of this text on segmenting the book region into spines, character detection using the system of Neumann, L and J Matas (2012), "Real-time scene text localization and recognition," in: CVPR, (hereinafter Neumann and Matas) may be performed and edges that are likely due to a character may be suppressed. Additionally, edges that would cut detected words into two parts may be suppressed. The remaining edges are clustered together to merge near-duplicates, and the resulting boundaries are used to segment the book region (or the entire image, if the system did not perform book/background segmentation) into individual book spines.

As such, in some embodiments of the present invention, processing of the photographic images comprises identifying line segments potentially corresponding to edges of book spines in said photographic images and identifying at least some of the line segments as corresponding to edges of book spines. The edges of book spines corresponding to boundaries defining each of the identified one or more regions. Further, processing of the photographic images may include determining a most frequently observed orientation of said line segments and inferring a book orientation corresponding to the most frequently observed orientation of said line segments. Line segments which are misaligned with the book orientation may be refrained from being identified as corresponding to edges of book spines. Line segments corresponding to edges of identified text may be refrained from being identified as line segments that correspond to edges of book spines. In some embodiments, the identified text used in line segment suppression as above may be retained for subsequent textual analysis for identifying a book corresponding thereto, as described below.

A variant of the algorithm described in (Talker) using a simplified parameterization of the book spine bounding box (a rectangle under translation, rotation, and scaling) may be used, and accordingly the user may be directed to capture photos with minimal foreshortening. This may make the full parameterization (a rectangle under perspective projection) used by (Talker) unnecessary. To facilitate recall, embodiments of the present invention also allow the detected book spine segments to extend outside of the image boundary, as this is a situation that occurs frequently in user-captured photos.

Throughout the process, the various inputs, intermediate results, and final results are stored in a database by the Play™ application.

The feature extraction microservice comprises an optical character recognition (OCR) component and a visual feature extraction component. First, the microservice attempts to read the text in the spine segment. The system identifies regions that are likely to be words using a text detection algorithm. That is, the system detects rectangular regions that are likely to be characters, and then groups those rectangular regions together into larger regions that are likely to be words. The system may be agnostic to the particular text detection system that is used. The text detection system disclosed in either (Neumann and Matas) or Huang, Weilin, Yu Qiao, and Xiaoou Tang (2014), "Robust Scene Text Detection with Convolutional Neural Network Induced MSER Trees," in: ECCV, pp. 497-511, (hereinafter Huang et al.) may be used, for example. The rectangular regions that the text detection system estimates to be words are passed to a text reading module to read the content in those regions. The system may be agnostic as to the particular OCR engine that is used. For example, the OCR engine may be Tesseract™ or the system of Bissacco, Alessandro, et al. (2013) "Photoocr: Reading text in uncontrolled conditions," in: ICCV (hereinafter Bissacco et al.) trained with data generated as in Jaderberg, Max, et al. (2014) "Reading Text in the Wild with Convolutional Neural Networks," arXiv preprint arXiv:1412.1842, (hereinafter Jaderberg et al.).

It is noted at this point that embodiments of the present invention use the output of an OCR engine in the manner described herein to improve the accuracy of the recognition system.

Embodiments of the present invention use the words that the OCR engine observes to train an OCR-engine-specific model for what words should be expected on a particular book's spine. For example, if the title "Start Over, Finish Rich" is consistently read by the OCR engine as "START OVER" (failing to observe "Finish Rich"), the present invention may be configured so as to learn not to expect the OCR engine to observe the text "Finish Rich" on the spine of this book.

The feature extraction microservice may also extract a collection of visual features. This collection of features may include a whole-segment HOG feature as in Dalal, Navneet, and Bill Triggs, (2005) "Histograms of oriented gradients for human detection," in: CVPR (hereinafter Dalal and Triggs), transformed via a winner-take-all (WTA) hash as in Yagnik, Jay, et al. (2011) "The power of comparative reasoning," in: ICCV (hereinafter Yagnik et al.). The collection of features may include a spatial pyramid as in Lazebnik, Svetlana, Cordelia Schmid, and Jean Ponce. (2006) "Beyond bags of features: Spatial pyramid matching for recognizing natural scene categories," in: CVPR (hereinafter Lazebnik et al.) of bags-of-visual-words as in Csurka, Gabriella, et al. (2004) "Visual categorization with bags of keypoints," in: ECCV, (hereinafter Csurka et al.) by soft clustering as in Liu, Lingqiao, Lei Wang, and Xinwang Liu. (2011) "In defense of soft-assignment coding," in: CVPR (hereinafter Liu et al.). The collection of features may include a dense grid of ORB features as in Rublee, Ethan, et al. (2011) "ORB: an efficient alternative to SIFT or SURF," in: ICCV, (hereinafter Rublee et al.) across a 1000-dimensional codebook, transformed via a WTA hash. Alternative features may be used, such as SIFT, as described in Lowe, David G. (1999) "Object recognition from local scale-invariant features, in: ICCV (hereinafter Lowe), or SURF, as described in Bay, Herbert, Tinne Tuytelaars, and Luc Van Gool, (2006) "Surf: Speeded up robust features," in: ECCV (hereinafter Bay). The collection of features may include a spatial pyramid of color histograms formed by clustering pixel values across a 500-dimensional codebook, transformed via a WTA hash.

It is contemplated that the features extracted by the feature extraction microservice (OCR word occurrences plus visual features) may be communicated to the Play™ application. The Play™ application is configured to store the features in the database, and queue the segment for an attempted match against an existing training dataset.

After a particular book spine has been observed and labeled several times, its appearance can be used to improve the future recognition accuracy for that book. To this end, the feature matching microservice is configured to accept the feature vector (OCR word occurrences plus visual features) that was extracted by the feature extraction microservice. In various embodiments, the sparse text-occurrence histogram is first used to find book identities in the training set that have expected text occurrences that are consistent with the query segment. The naive-Bayes probability is computed for the identities in the training set that have enough overlap with the text occurrences observed in the query segment and consider those above a predetermined threshold. The value of this threshold may be determined via experimentation, as it may depend on the size of the training dataset and the consistency of the results returned by the particular choice of OCR engine. Within that set of possible book identities, the visual features may be used to perform a nearest neighbor search. The distance to the nearest distractor match may also be found, where the nearest distractor match is a match that is inconsistent with the identity of the nearest neighbor. A ratio of distance-to-nearest-neighbor to distance-to-nearest-distractor may be computed and, only if that ratio exceeds a predetermined threshold, the matching process is considered successful.

In some embodiments, matching of extracted visual features against models stored in a training set may be accomplished at least in part by naïve-Bayes inference over a categorical, bag-of-words occurrence model on the text features, followed by a visual-feature-based nearest neighbor search within the high probability identities. In some embodiments, matching of extracted visual features against models stored in a training set may be accomplished at least in part by approximate nearest neighbor search using all features simultaneously. In some embodiments, matching of extracted visual features against models stored in a training set may be accomplished at least in part by deep neural network similarity learning.

In some embodiments, the bag-of-words occurrence model is constructed by associating book identities with the text occurring on the spines of said books as follows. Where D is a dictionary, indexed by i, of the K most frequently observed sequences of characters (a token) across all book spines observed thus far, and where O is the set of tokens on an individual book spine, a sparse histogram, X, is formed by setting feature dimension i of X to 1 if and only if token $D_i$ is present in O. In some embodiments, these sparse histograms are further aggregated and transformed by term frequency-inverse document frequency (TF-IDF) weighting as described in Manning, Christopher D., Prabhakar Raghavan, and Hinrich Schütze, (2008) "Introduction to information retrieval" Cambridge University Press (hereinafter Manning) In performing the TD-IDF weighting, our analogue of a "document" is the set of all book spines identified to be the same book. Thus, the term-frequency for a token/book-id combination is the number of times a particular token was observed on book spines of a given book identification. The document frequency for a token is the number of unique book identities for which we have a spine on which we have observed that token.

In some embodiments, the visual-feature-based nearest neighbor search is performed as follows. Where N is the number of visual features being analyzed, an N-dimensional space is defined with each dimension representing one of the visual features arranged on a quantifiable scale. Book spines can then be associated with points in this N-dimensional feature space. In some embodiments, a transformation is learned for applying to these feature dimensions using the technique of Chechik, Gal, Varun Sharma, Uri Shalit, and Samy Bengio. (2010) "Large scale online learning of image similarity through ranking" in: Journal of Machine Learning Research 11: 1109-1135 (hereinafter Chechik). In some embodiments, the transformation is learned using a deep convolutional neural network as in Wang, Jiang, Yang Song, Tommy Leung, Catherine Rosenberg, Jingbin Wang, James Philbin, Bo Chen, and Ying Wu. (2014) "Learning fine-grained image similarity with deep ranking" in: CVPR (hereinafter Wang). In some embodiments the visual feature representations of book spines are indexed in an approximate nearest neighbor search structure for the purpose of efficient search as in Marius Muja and David G. Lowe. (2014) "Scalable Nearest Neighbor Algorithms for High Dimensional Data". in: Pattern Analysis and Machine Intelligence, Vol. 36 (hereinafter Muja).

To further facilitate precision of feature matching, a purported match may be confirmed via a geometric consistency check of the observed text. The relative locations of the text reported by the OCR engine should be consistent between the query image and the previously seen examples. In some embodiments, consistency checks may be achieved by modeling a Gaussian distribution over the expected detection centres for each commonly detected sequence of characters on the spine (words, or common OCR mistakes). In some embodiments, if the likelihood of the data (the detection centres for the observed words) given the expected distribution is large enough, the purported match survives, otherwise, it is discarded.

If the above-described feature matching process is successful, the spine segment may be considered to be identified and the result is returned to the Play™ application for storage in the database and communication to the originating mobile device.

Alternatively, if the feature matching process is unsuccessful, the system may follow a branch that allows bootstrapping of a reference database with human labeled training data.

In various embodiments, a segment is processed in this bootstrapping branch if the feature matching microservice fails to identify a spine segment, or if that identification was rejected by the user. The bootstrapping branch first attempts to match the text extracted by the OCR engine against a reference database of book metadata (titles and authors). The words read by the text-reading module are used to perform a text-based query against an extensive list of book titles and authors, as would be readily understood by a worker skilled in the art. In some embodiments, the extensive list of book titles and authors is stored in an ElasticSearch™ server, which executes the text-based query. While less accurate, this text-based query against book metadata sometimes yields an identification. If an unambiguous match is found with high confidence, the book is considered to have been identified, and the system returns that identity to the user, who is prompted to mark the identification as correct or incorrect.

It is considered that that the words read by the text-reading module may be insufficient to return a high confidence match within the list of book titles and authors. If this is the case, or if a user marks the text-based identification as incorrect, the identification task is passed to a human for labeling. In some embodiments, this is a Human Intelligence Task (HIT) within Amazon™'s Mechanical Turk™. In some embodiments, the User Interface (UI) for this HIT presents a human labeler with up to twelve spine segments that need labeling. For each segment, the interface allows the human labeler to identify it as matching one of the books in the book metadata dataset or mark it as unidentifiable.

In various embodiments, both the OCR-to-metadata matching and the interface for human labeling utilize a dataset of book metadata. In some embodiments, a dataset called "Books in Print" may be used, which contains book metadata (authors, titles, publishers, categorization, ISBNs) for approximately 15 million English books.

In various embodiments, it is contemplated that the end result of each of the feature-matching branch, OCR-to-metadata matching branch, and the human labeling branch is substantially the same: an estimated identity for the spine segment. As each segment is identified, the view presented in the mobile device is updated to show the user the new identification. The mobile device is configured to allow the user to mark each of the identifications as correct or incorrect. If the user marks the segment identification as incorrect, the mobile device invites the user to provide the correct identification of the book. If the user marks a book as incorrect and declines to provide the correct identification, the mobile device communicates that signal to the remote server and the Play™ application re-queues the segment for human labeling. If the user provides a corrected identification, the mobile device communicates that identification to the remove server.

In various embodiments, segments that were labeled by a human labeler (either the user of the originating mobile device, or a human performing labeling tasks for the remote server), and segments that were automatically recognized and marked as correct by the user of the mobile device are treated as ground truth training data, whose features can be folded back into the training set used for matching.

It is considered that, in many cases, only a subset of a user's identified books will have associated offers. The Play™ application communicates associated offers to the mobile device for presentation to the user. This offer may be a discounted or free eBook or audiobook version of the identified book, and the process for accepting the offer is the process described in International Patent Application Publication No. 2014/015437. These offers are the incentive for the user to collect the bookshelf photographs in the first place.

Figure 3:
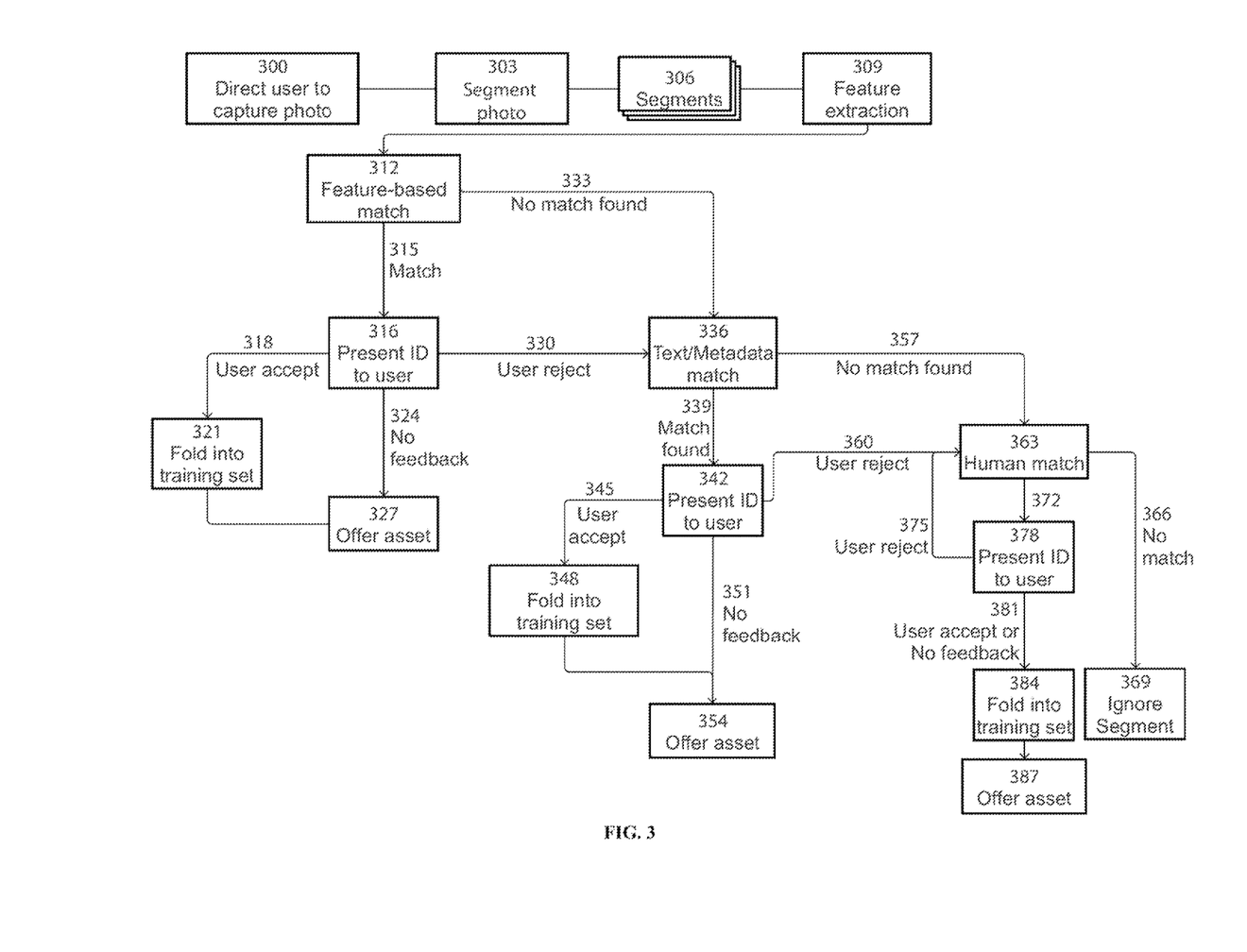
FIG. 3 illustrates a flow chart of an interleaved book recognition and training process, in accordance with an embodiment of the present invention.

Having reference to FIG. 3, an embodiment of the present invention is illustrated which enables an interleaved book recognition and training process. This embodiment directs and guides a user to capture 300 an adequately aligned photo of their bookshelf, which may be sent to a segmentation server. The embodiment further includes segmentation 303 of that photo image into book spine segments 306. For each book spine segment, the embodiment further includes visual feature extraction 309 including OCR-engine-specific text features. The embodiment then first attempts a matching operation 312 based on visual features including OCR-engine-specific text features. If a sufficiently close match was found 315, the matched identity is presented 316 to the user along with a mechanism in the user interface for indicating acceptance or rejection of the segment's identification. If the user accepts 318 the identification, the features are folded into the training set 321 and if there is an associated offer, it is presented 327 to the user. If the user provides no feedback 324 and if there is an associated offer, the offer is presented 327 to the user. If the user rejects 330 the identification, the embodiment proceeds to a text/metadata matching process 336. Likewise, if the matching operation based on visual features 312 fails to find a match 333, the embodiment proceeds to a text/metadata matching process 336. If the text/metadata matching process finds a match 339, the matched identity is presented 342 to the user along with a mechanism in the user interface for indicating acceptance or rejection of the segment's identification. If the user accepts 345 the identification, the features are folded into the training set 348 and if there is an associated offer, it is presented 354 to the user. If the user provides no feedback 351 and if there is an associated offer, it is presented 354 to the user. If the user rejects 360 the identification, or if the matching process 336 fails 357 to find a match, the embodiment proceeds to a human-assisted labeling step 363. If the human assisted labeling step 363 fails 366 to return a match, the segment is ignored 369. If the human assisted labeling step produces an identification 372, the matched identity is presented 378 to the user along with a mechanism in the user interface for indicating acceptance or rejection of the segment's identification. If the user accepts the identification or provides no feedback 381, the features are folded into 384 the training set and if there is an associated offer, it is presented 387 to the user. If the user rejects 375 the identification, the embodiment sends the segment back to the human assisted labeling step 363 for an additional attempt at identification, or determination that there is no acceptable match 366.

The above aspect of the present invention corresponds to a combination of a bootstrapped learning and recognition system (that gathers user-provided photographs and labeling hints) with a method of easily acquiring a discounted eBook or audiobook asset, or browsing the collections of books that have been identified for other users, which provides an incentive for the user to acquire the photographs and provide labeling hints. Each of these components benefits the other.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for identifying books located on a bookshelf, the method comprising:

capturing one or more photographic images of the bookshelf;

segmenting the photographic images into regions, each of the regions corresponding to a respective book spine;

analyzing at least one of the regions to identify a book corresponding thereto, wherein analyzing the at least one of the regions comprises:

extracting one or more visual features descriptive of the at least one of the regions, the one or more visual features including machine-recognized text and a location of the machine-recognized text contained within the at least one of the regions, wherein the machine-recognized text and the location of the machine-recognized text are used as analogues of visual features;

performing a matching operation based on the one or more visual features, the matching operation performed against stored data associating plural book identities with corresponding visual features;

when the matching operation returns one of the book identities sufficiently closely matched with the one or more visual features, identifying the at least one of the regions as representing said one of the book identities;

when the matching operation fails to return one of the book identities sufficiently closely matched with the one or more visual features, initiating a further analysis of the at least one of the regions to identify the book corresponding thereto; and         when the further analysis returns a further book identity sufficiently closely matched with the one or more visual features, identifying the at least one of the regions as representing the further book identity; and     browsing another user's bookshelf, wherein browsing another user's bookshelf comprises:

comparing a first book title list of a first bookshelf belonging to a first user with a second book title list of a second bookshelf belonging to a second user, wherein the first book title list and the second book title list include book titles identified as a result of analyzing the at least one of the regions; and
enabling the first user to access the second book title list of the second bookshelf when there is at least a predetermined amount of overlap between the book titles of the first user's bookshelf and the book titles of the second user's bookshelf.

2. The method of claim 1, further comprising, when the matching operation returns said one of the book identities, updating the stored data to reflect association between said one of the book identities and the one or more visual features.

3. The method of claim 1, further comprising, when the further analysis returns the further book identity, updating the stored data to reflect association between the further book identity and the one or more visual features.

4. The method of claim 1, wherein the further analysis includes providing the at least one of the regions to a human labeller and receiving the further book identity from the human labeller.

5. The method of claim 1, further comprising prompting a user who captured said one or more photographic images of the bookshelf to mark the returned one of the book identities or the returned further book identity as being correct or incorrect.

6. The method of claim 5, further comprising, when the user marks the returned one of the book identities or the returned further book identity as being incorrect, prompting the user to provide a user-supplied book identity corresponding to the at least one of the regions, and, upon receipt of the user-supplied book identity, updating a training set to reflect association between the user-supplied book identity and the one or more visual features.

7. The method of claim 1, wherein the stored data comprises models stored in a training set.

8. The method of claim 1, wherein the matching operation comprises querying a database comprising records of book identities and visual features associated with said book identities.

9. The method of claim 1, wherein the one or more visual features further include one or more of: texture, colour and shape of the at least one of the regions.

10. The method of claim 1, wherein the matching operation comprises performing a naïve-Bayes inference over a categorical, bag-of-words occurrence model on the machine-recognized text to determine a plurality of high-probability-of-match candidate book identities, and a visual-feature-based nearest neighbor search performed on the high-probability-of-match candidate book identities.

11. The method of claim 1, wherein the matching operation comprises performing an approximate nearest neighbor search based simultaneously on all of the extracted one or more visual features.

12. The method of claim 1, wherein the matching operation comprises performing deep neural network similarity learning.

13. The method of claim 1, wherein the matching operation comprises performing a geometric consistency check on locations of the machine-recognized text relative to locations of text observed in training examples contained within the stored data, and wherein match closeness increases with geometric consistency.

14. The method of claim 1, further comprising determining which of the identified books on the bookshelf are associated with offers for corresponding digital assets, and presenting a user with said offers.

15. A system for identifying books located on a bookshelf, the system comprising:
a mobile device configured to capture one or more photographic images of the bookshelf;
a computer server configured to receive the captured one or more photographic images and to:
segment the photographic images into regions, each of the regions corresponding to a respective book spine;
analyze at least one of the regions to identify a book corresponding thereto, wherein the computer server is further configured, in furtherance of analyzing the at least one of the regions, to:
extract one or more visual features descriptive of the at least one of the regions, the one or more visual features including machine-recognized text and a location of the machine-recognized text contained within the at least one of the regions, wherein the machine-recognized text and the location of the machine-recognized text are used as analogues of visual features;
perform a matching operation based on the one or more visual features, the matching operation performed against stored data associating plural book identities with corresponding visual features;
when the matching operation returns one of the book identities sufficiently closely matched with the one or more visual features, identify the at least one of the regions as representing said one of the book identities;
when the matching operation fails to return one of the book identities sufficiently closely matched with the one or more visual features, initiate a further analysis of the at least one of the regions to identify the book corresponding thereto; and
when the further analysis returns a further book identity sufficiently closely matched with the one or more visual features, identify the at least one of the regions as representing the further book identity; and
browse another user's bookshelf, wherein browsing another user's bookshelf comprises:
comparing a first book title list of a first bookshelf belonging to a first user with a second book title list of a second bookshelf belonging to a second user, wherein the first book title list and the second book title list include book titles identified as a result of analyzing the at least one of the regions; and
enabling the first user to access the second book title list of the second bookshelf when there is at least a predetermined amount of overlap between the book titles of the first user's bookshelf and the book titles of the second user's bookshelf.

16. The system of claim 15, wherein the computer server is further configured when the matching operation returns said one of the book identities, to update the stored data to reflect association between said one of the book identities and the one or more visual features.

17. The system of claim 15, wherein the computer server is further configured when the further analysis returns the further book identity, to update the stored data to reflect association between the further book identity and the one or more visual features.

18. The system of claim 15, wherein the further analysis includes providing the at least one of the regions to a human labeller and receiving the further book identity from the human labeller.

19. The system of claim 15, wherein the mobile device is further configured to prompt a user who captured said one or more photographic images of the bookshelf to mark the returned one of the book identities or the returned further book identity as being correct or incorrect.

20. The system of claim 19, wherein the mobile device is further configured, when the user marks the returned one of the book identities or the returned further book identity as being incorrect, to prompt the user to provide a user-supplied book identity corresponding to the at least one of the regions, and, upon receipt of the user-supplied book identity, the system is configured to update a training set to reflect association between the user-supplied book identity and the one or more visual features.

21. The system of claim 15, wherein the stored data comprises models stored in a training set.

22. The system of claim 15, wherein the matching operation comprises querying a database comprising records of book identities and visual features associated with said book identities.

23. The system of claim 15, wherein the one or more visual features further include one or more of: texture, colour and shape of the at least one of the regions.

24. The system of claim 15, wherein the matching operation comprises performing a naïve-Bayes inference over a categorical, bag-of-words occurrence model on the machine-recognized text to determine a plurality of high-probability-of-match candidate book identities, and a visual-feature-based nearest neighbor search performed on the high-probability-of-match candidate book identities.

25. The system of claim 15, wherein the matching operation comprises performing an approximate nearest neighbor search based simultaneously on all of the extracted one or more visual features.

26. The system of claim 15, wherein the matching operation comprises performing deep neural network similarity learning.

27. The system of claim 15, wherein the matching operation comprises performing a geometric consistency check on locations of the machine-recognized text relative to locations of text observed in training examples contained within the stored data, and wherein match closeness increases with geometric consistency.

28. The system of claim 15, wherein the mobile device and the computer server are further cooperatively configured to determine which of the identified books on the bookshelf are associated with offers for corresponding digital assets, and to present a user with said offers.

* * * * *